(12) United States Patent
Swoboda et al.

(10) Patent No.: US 7,753,153 B2
(45) Date of Patent: Jul. 13, 2010

(54) ADAPTIVE CRUISE CONTROL DEVICE FOR A MOTOR VEHICLE

(75) Inventors: Hans-Christian Swoboda, Ludwigsburg (DE); Albrecht Irion, Stuttgart (DE); Dirk John, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 207 days.

(21) Appl. No.: 10/475,407

(22) PCT Filed: Sep. 27, 2002

(86) PCT No.: PCT/DE02/03698

§ 371 (c)(1),
(2), (4) Date: Apr. 7, 2004

(87) PCT Pub. No.: WO03/072386

PCT Pub. Date: Sep. 4, 2003

(65) Prior Publication Data

US 2004/0149504 A1    Aug. 5, 2004

(30) Foreign Application Priority Data

Feb. 22, 2002    (DE) .............................. 102 07 580

(51) Int. Cl.
*B60T 7/12* (2006.01)
(52) U.S. Cl. ................. 180/170; 701/96; 180/178; 180/167
(58) Field of Classification Search .............. 180/167, 180/169, 170, 178, 179; 701/93, 96
See application file for complete search history.

(56) References Cited

U.S. PATENT DOCUMENTS 5,529,139 A * 6/1996 Kurahashi et al. ........... 180/169
5,761,629 A * 6/1998 Gilling ......................... 701/96
5,999,874 A   12/1999 Winner et al.
6,116,369 A * 9/2000 King et al. .................. 180/169

(Continued)

FOREIGN PATENT DOCUMENTS

DE    100 30 258    1/2002

(Continued)

OTHER PUBLICATIONS

Winner et al., Adaptive Cruise Control System Aspects and Development Trends, SAE International Congress & Exposition, Detroit, Michigan, Feb. 26-29, 1996, SAE Technical Paper Series, 961010, pp. 27-36.

(Continued)

*Primary Examiner*—Jeffrey J Restifo
(74) *Attorney, Agent, or Firm*—Kenyon & Kenyon LLP

(57) ABSTRACT

A method and an apparatus are provided for the adaptive cruise control of a motor vehicle along the lines of a distance-constant control and a speed-constant control, respectively, which apparatus includes at least two devices interconnected by a data-exchange device. The first device includes at least one transmitting and receiving unit for detecting objects, which operates according to the radar principle and/or lidar principle, as well as at least one target-object-selection device. The second device includes at least one speed and distance controller, and is connected to the first device by a data-exchange system through which data with respect to two detected objects is transmitted.

16 Claims, 2 Drawing Sheets

U.S. PATENT DOCUMENTS

| | | | |
|---|---|---|---|
| 6,337,638 B1 | 1/2002 | Bates et al. | |
| 6,470,257 B1 * | 10/2002 | Seto | 701/96 |
| 6,484,087 B2 * | 11/2002 | Shirai et al. | 701/96 |
| 6,496,771 B2 * | 12/2002 | Hattori et al. | 701/96 |
| 6,498,972 B1 * | 12/2002 | Rao et al. | 701/45 |
| 6,560,525 B1 * | 5/2003 | Joyce et al. | 701/96 |
| 6,580,385 B1 * | 6/2003 | Winner et al. | 342/70 |
| 6,580,996 B1 * | 6/2003 | Friedrich | 701/96 |
| 6,597,981 B2 * | 7/2003 | Nishira et al. | 701/96 |
| 6,628,227 B1 * | 9/2003 | Rao et al. | 342/70 |
| 6,675,094 B2 * | 1/2004 | Russell et al. | 701/301 |
| 6,805,216 B2 * | 10/2004 | Noecker | 180/170 |
| 6,941,216 B2 * | 9/2005 | Isogai et al. | 701/96 |
| 6,968,266 B2 * | 11/2005 | Ahmed-Zaid et al. | 701/96 |
| 7,009,500 B2 * | 3/2006 | Rao et al. | 340/435 |
| 2001/0039472 A1 | 11/2001 | Teramura et al. | |

FOREIGN PATENT DOCUMENTS

| | | |
|---|---|---|
| EP | 0 657 857 | 6/1995 |
| EP | 0 716 949 | 6/1996 |
| JP | 11034690 | 2/1999 |
| WO | WO 00/36435 | 6/2000 |

OTHER PUBLICATIONS

E. Kittler, Auf eigene Verantwortung (On One's Own Responsibility), Mot Feb. 2000, pp. 74-76.

* cited by examiner

ADAPTIVE CRUISE CONTROL DEVICE FOR A MOTOR VEHICLE

FIELD OF THE INVENTION

A method and an apparatus are provided for adaptive cruise control of a motor vehicle along the lines of a distance-constant control and a speed-constant control, respectively, which apparatus includes at least two devices interconnected by a data-exchange device. The first device includes at least one transmitting and receiving unit for detecting objects, which operates according to the radar principle and/or lidar principle, as well as at least one target-object selection device. The second device includes at least one speed and distance controller, and is connected to the first device by a data-exchange system through which data with respect to two detected objects is transmitted.

BACKGROUND INFORMATION

The publication "*Adaptive Cruise Control System Aspects and Development Trends*" by Winner, Witte et al., released at the SAE International Congress & Exposition, Detroit, Feb. 26-29, 1996, describes an adaptive cruise controller which detects preceding vehicles by radar radiation and undertakes a distance control or speed control as a function of the detected objects. This publication describes constructing such a unit so that the radar device, the target-object selection, as well as the distance and speed controller are accommodated in a shared housing.

From the publication "*Auf eigene Verantwortung*" (On One's Own Responsibility) by E. Kittler, published in the periodical *Mot* 2/2000, pp. 74 through 76, an autonomous intelligent cruise controller is described, in which the distance sensor, operating on the basis of radar, as well as the control unit for the distance and speed control are provided separately in a vehicle.

SUMMARY OF THE INVENTION

The present invention provides a system for adaptive cruise control of a motor vehicle along the lines of a distance-constant control and a speed-constant control, respectively, which system is made of two devices interconnected by a data-exchange device. The first device includes at least one object-detection device as well as at least one target-object selection device. The object-detection device is able to detect further vehicles and objects in the vicinity of one's own vehicle, and to measure their characteristic, kinematic variables. In the target-object selection device of the first device, two objects are selected from the detected objects, and the characteristic, kinematic variables of these two selected objects are forwarded for further processing to a second device which includes at least one distance and speed controller. From the characteristic, kinematic variables of the two selected, detected objects, this distance and speed controller generates output signals by which a power-regulating control element of an internal combustion engine or an actuator of the deceleration arrangement may be controlled. Due to the selection of exactly two objects by the target-object selection device and the transmission of the associated characteristic, kinematic variables to the distance and speed controller, the amount of data between the first device and the second device is kept small. Conventional systems either transmit all detected object data between the first device and the second device, which may result in a very great abundance of transmitted data, although a large part of the detected objects is irrelevant for the instantaneous distance and speed control. Other conventional systems select precisely one object from the detected objects, whose characteristic, kinematic variables are used for the distance and speed control. In traffic situations in which the selected target object leaves one's own lane or in which a further vehicle slips in between one's own vehicle and the preceding target object, this leads to unwanted control reactions which may express themselves, for example, by bucking, jerky giving of gas, jerky taking away of gas or jerky response of the deceleration arrangement. By transmitting the characteristic, kinematic variables of precisely two objects, it is possible to transmit the variables of a further object in addition to the variables of the selected target object. In so doing, the kinematic variables of the object classified as a potential future target object are transmitted. The distance and speed controller is thereby already able to adjust early to the new situation which comes about, for example, by a vehicle slipping in, or the target object changing lanes. The control response of a vehicle controlled in this manner thereby improves noticeably due to gentle transitions in response to strongly changing control situations.

It is also an object of the present invention to indicate an apparatus that includes at least one device for detecting objects, one device for target-object selection and one device for transmitting data. In this context, the device for object detection detects the vehicles and objects located in the surrounding region of one's own vehicle. Moreover, this object-detection device is able to acquire characteristic, kinematic variables of the vehicles, among these variables also being those which are of special interest for a cruise control along the lines of a distance-constant control or speed-constant control. From the detected objects, the device for target-object selection selects the target object which is of special interest for the control and which determines the instantaneous control response. Moreover, the device for target-object selection selects a further object which could be selected as the new target object in the further course, and therefore influences the control activity. The device for transmitting data routes the characteristic, kinematic variables of the selected objects to the control device.

Another object of the present invention is an apparatus for controlling the traveling speed along the lines of a speed-constant control or distance-constant control, which includes at least one distance and speed controller, a data-exchange device, as well as output devices for relaying output signals. According to the present invention, with the aid of the data-exchange device, this apparatus receives characteristic, kinematic variables of precisely two objects which were detected by an object-detection system, and supplies the variables to the distance and speed controller. Having regard for the characteristic, kinematic variables, the distance and speed controller in turn generates output signals by which at least one power-regulating control element of an internal combustion engine and/or a device for actuating the deceleration arrangement may be controlled.

A further object of the present invention is an apparatus for the exchange of signals between a first device and a second device, the characteristic, kinematic variables of precisely two detected objects being transmitted by the apparatus of the present invention. The first device includes at least one object-detection unit and at least one device for target-object selection, and the second device includes at least one speed and distance controller.

The present invention also provides a method for the exchange of signals between a first device and a second device, the first device including at least one object-detection system and a device for the target-object selection, and the second device including at least one speed and distance controller. The essence of the method is to forward the characteristic, kinematic variables, acquired by the object-detection system, of precisely the two objects which were selected by the target-object selection device, to the second device in which control signals are provided (generated) for a power-regulating final controlling element of an internal combustion engine and for a triggering of the deceleration arrangement.

The object-detection device may be a transmitting and receiving unit for radar radiation and/or a transmitting and receiving unit for lidar radiation and/or a receiving unit for an image sensing system. In this connection, the radar method according to which the transmitting and receiving unit for radar radiation operates and the ranges for which it is configured are unimportant. In principle, this system is able to operate with any radar modulation or any radar range. The image sensing system may include a video camera, which may also be a stereo video camera, and which is able to receive image information in the visible or even in the infrared light spectrum. The image sensing system may include a lighting device which illuminates the desired sensing range with visible or even infrared light, in order to improve the image sensing properties.

Moreover, the characteristic, kinematic variables, which correspond to the transmitted data, may be at least one of the following variables: distance of the object to the object-detection device, relative velocity of the object in relation to one's own vehicle velocity or absolute velocity of the object, relative acceleration of the object with respect to one's own vehicle or absolute acceleration of the object, sway of the object relative to the vehicle longitudinal axis or relative to the center axis of the object-detection device, lateral velocity of the object relative to the vehicle longitudinal axis or the center axis of the object detection system, a clear-cut object designation, information about whether the object was detected for the first time or was already detected repeatedly, information about the performance reliability of the object-detection device, for example, whether it is exactly adjusted, whether it is soiled, whether it is blinded at the moment, or whether visibility is poor.

The first device and the second device may be accommodated in a shared housing. In providing a shared housing for the first and the second device, it is advantageous that one gets along with a single unit, and does not have to accommodate two units at different places in the vehicle and connect them.

The first device and the second device may be accommodated in two separate housings. The spatial separation of the first device and the second device in separate housings allows for a sensor which is very small with respect to the construction size, and therefore is very versatile in its usage. In this case, the second housing is to be provided at a distant location at which sufficient space is available.

The apparatus for the exchange of signals between the first device and the second device may be a CAN bus.

Implementation of the method according to the present invention in the form of a control element, which is provided for a control unit of an adaptive distance control and speed control of a motor vehicle, is especially important. In this context, a program capable of running on a computer, e.g., on a microprocessor, and suitable for executing the method according to the present invention, is stored on the control element. Thus, in this case, the present invention is implemented by a program stored on the control element, so that this control element provided with the program constitutes the present invention in the same manner as the method for whose execution the program is suitable. An electric storage medium such as a read-only memory may be used as the control element.

DETAILED DESCRIPTION

Figure 1:
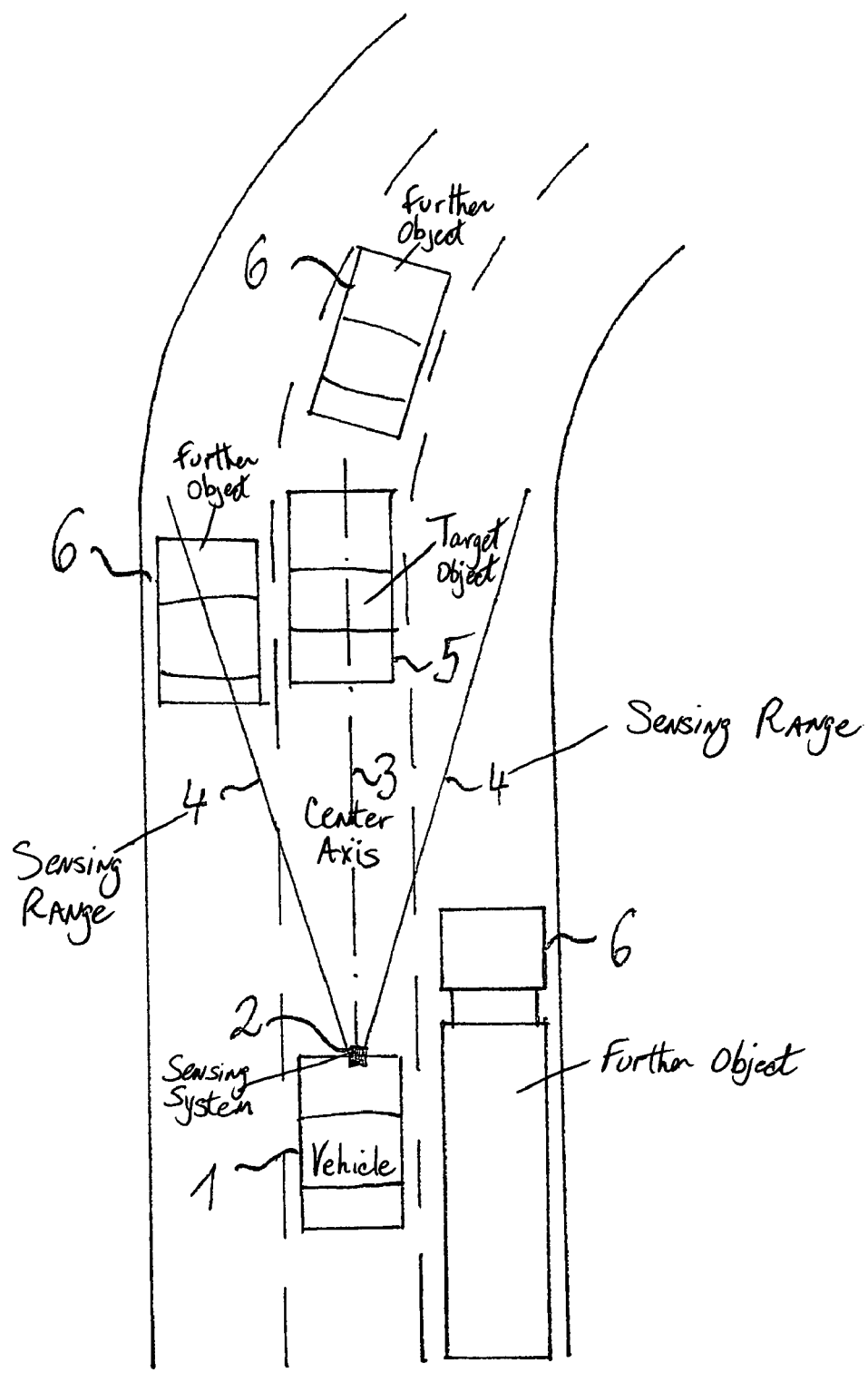
FIG. 1 shows an illustrative surroundings situation for the use of an adaptive distance and speed control.

FIG. 1 shows an exemplary traffic situation for the use of an adaptive distance and speed controller. One may see vehicle 1, equipped with adaptive distance and speed controller 2, which is moving, for example, in the center lane of a multi-lane road. Object detection system 2, which may be implemented as a radar system, lidar system or video system and which is customarily mounted on the front side of vehicle 1, detects the further objects in the surrounding field of the vehicle which are located within the sensing range whose limits are indicated by the two lines 4. Center axis 3 of the object sensing range is also drawn in, which, in the case of a radar device or lidar device, coincides with the principal beam direction of the transmitting and receiving devices. A target-object selection device selects a suitable target object 5 from the objects detected by object sensing system 2. This target object may be vehicle 5 directly in front of one's own vehicle, whose behavior from the standpoint of operating dynamics dominantly influences the control response of one's own vehicle 1. Further objects 6 are recognized only if they are moving within sensing range 4. The operating-dynamics variables of these further objects 6 achieve relevance in the case when this further object intends it, for example, by a planned cut-in maneuver between one's own vehicle 1 and preceding vehicle 5, or when target-object vehicle 5 falls out, for example, due to a lane change, and a further preceding vehicle 6 is identified as the new target object. Thus, the operating-dynamics variables of current target object 5, as well as the operating-dynamics variables of a further detected object 6 which was recognized as a potential future target object, are relevant for the instantaneous and the future control response of vehicle 1.

Figure 2:
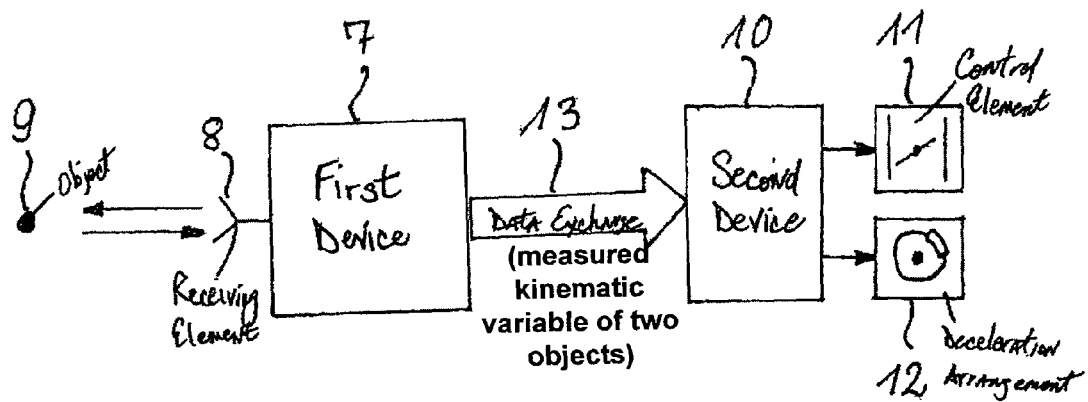
FIG. 2 shows a first exemplary embodiment of the apparatus according to the present invention.

A first exemplary embodiment of the apparatus according to the present invention is shown in FIG. 2. One may see a first device 7, which, according to the present invention, includes at least one object-detection device as well as a target-object selection device. In the event the object-detection system is a radar system or lidar system, this first device 7 is provided with a transmitting and receiving device 8. In the case of an object-detection system in the form of an image sensing device, receiving element 8 represents a pure receiving system that, for example, may take the form of a video camera. Transmitting and receiving device 8 sends out radar signals or lidar signals which, in the case of a preceding vehicle, are reflected at this object 5, 6 and are reflected back to the transmitting and receiving device. The object-detection device is able to acquire operating-dynamics variables such as the distance of object 9, the absolute velocity or relative velocity of object 9 in relation to transmitting and receiving device 8, the absolute acceleration or relative acceleration of object 9 in relation to the object-detection system, the lateral velocity of object 9 relative to the vehicle longitudinal axis or object-detection center axis 3, and to provide information about whether the object-detection system is exactly adjusted, is soiled, is blinded, or whether visibility is poor.

From detected objects 9, the target-object selection device, further provided in first device 7, selects the target object whose operating-dynamics variables have a dominant effect on the distance and speed controller. The target-object selection device also selects a further detected object, which was identified as a potential future target object. In so doing, objects 9 are considered which slip in between one's own vehicle 1 and target object 5, or objects 6 preceding target object 5 are considered for the case when target object 5 falls out of the current traffic lane and is no longer suitable as a target object. The characteristic, kinematic or operating-dynamics variables of these two objects, selected by the target-object selection device, are routed via a device for data exchange 13 to a second device 10.

This second device 10 includes at least one speed and distance controller. In the case when no preceding object was detected, this distance and speed controller functions as a constant-speed controller, and in the case when at least one preceding object 5 was detected, functions as a constant-distance controller. To that end, the operating-dynamics variables transmitted by data-exchange device 13 are routed to the distance and speed controller which generates two output signals that influence the performance. These two output signals are an output variable for controlling a power-regulating control element 11 for an internal combustion engine, e.g., an electrically actuated throttle valve or an electrically controlled injection system, as well as a control signal for triggering deceleration arrangement 12 of vehicle 1. Because first device 7 transmits only the operating-dynamics variables of two detected objects to second device 10 via data-exchange device 13, the amount of data between first device 7 and second device 10 is kept small in comparison to systems which transmit operating-dynamics variables with respect to all detected objects. Compared to systems which transmit only the operating-dynamics variables of target object 5, a better control response results, e.g., in driving situations in which target object 5 is changed, since the operating-dynamics variables of the potential new target object are already available prior to the target-object change of the distance and speed controller. The modular configuration of this adaptive speed and distance controller makes it possible to provide first device 7 and second device 10 in separate housings, which means the first device, in a small type of construction, may be mounted on the front of the vehicle, and second device 10 may be installed at a convenient place at another location in the vehicle.

Figure 3:
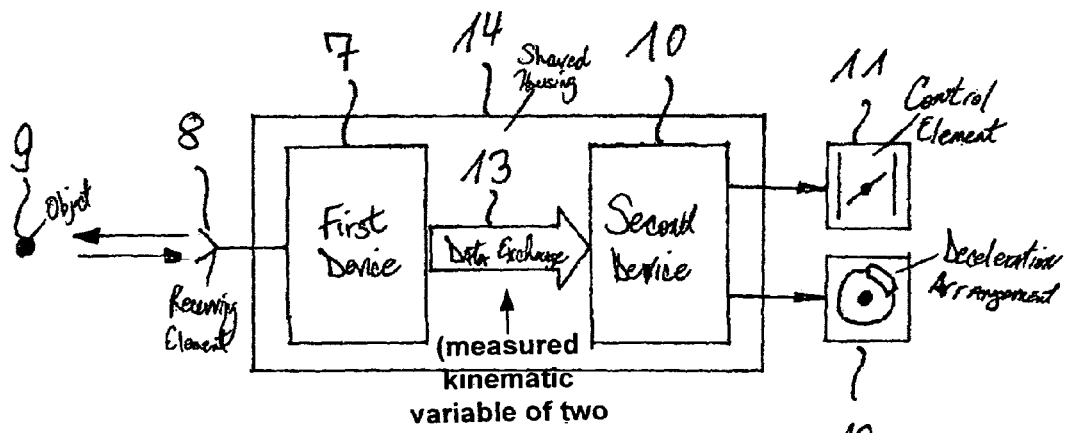
FIG. 3 shows a further exemplary embodiment of the apparatus according to the present invention.

FIG. 3 shows a further exemplary embodiment of the apparatuses according to the present invention. Again, one is able to see first device 7, which includes at least one object-detection device as well as a target-object selection device. Through transmitting and receiving element 8, which, in the case of an image recognition system, may also be implemented as a pure receiving element, radar or lidar beams are sent out which are reflected at a preceding object 9 and are received by receiving element 8. From the detected objects, the target-object selection device selects a target object which dominantly influences the controller response of the distance and speed controller, as well as a further, potential, future target object. The operating-dynamics variables of these two selected objects are routed to second device 10 by data-exchange device 13. In this second device 10, which includes at least one distance and speed controller, from the transmitted, operating-dynamics variables of the two selected objects, first of all an output signal for a power-regulating control element 11 of an internal combustion engine is generated, and furthermore, an output signal is generated for controlling deceleration arrangement 12 of the vehicle. It is also within the meaning of the present invention that first device 7 and second device 10 are accommodated in a shared housing 14, so that data-exchange device 13 represents an internal interface between two modules 7, 10. This modular configuration of the adaptive speed and distance controller makes it possible to provide a standardized first device, as well as a standardized second device 10, which may be interconnected depending upon the use of this distance and speed controller.

It is also conceivable to provide two first devices 7 that transmit data via data-exchange devices 13 to a second device 10 in common, thereby permitting a very universal utilization of this system. By the transmission of the operating-dynamics variables of two objects, the distance and speed controller, provided in second device 10, is independent of the selection criteria of the target-object selection device in first device 7, which means an improved control function is achieved in complex traffic situations. The modular configuration furthermore permits better interchangeability of the object-detection system and of the control unit which acts directly on actuators 11, 12.

What is claimed is:

1. An apparatus for an adaptive cruise control of a motor vehicle, comprising:
   a first device including at least one object-detection arrangement and at least one target-object selection arrangement,
   wherein the object-detection arrangement detects and measures a kinematic variable of more than two objects, and the at least one target-object selection arrangement selects exactly two of the more than two detected objects, the exactly two objects respectively denoting a target object and a potential future target object;
   a second device including at least one speed and distance controller; and
   a data-exchange device that connects the first device and the second device;
   wherein the data-exchange device transmits the measured kinematic variable of the exactly two selected objects from the first device to the second device at which the kinematic variable of the target object is used to control the at least one speed and distance controller and the kinematic variable of the potential future target object is kept standing by as a substitute for the target object, and wherein the adaptive cruise control includes at least one of a constant-distance control and a constant-speed control.

2. The apparatus according to claim 1, wherein the at least one object-detection unit includes at least one of a transmitting-and-receiving unit for radar radiation, a transmitting-and-receiving unit for lidar radiation, and a receiving unit for an image sensing system.

3. The apparatus according to claim 1, wherein the data transmitted by the data-exchange device represents at least one of kinetic variables including distances of objects to the at least one object-detection arrangement, relative velocities of objects with respect to the at least one object-detection arrangement, absolute velocities of objects, relative accelerations of objects in relation to the at least one object-detection arrangement, absolute accelerations of objects, sway of objects relative to one of a vehicle longitudinal axis and a center axis of the at least one object-detection arrangement, lateral velocities of objects relative to the vehicle longitudinal axis and the center axis of the at least one object-detection arrangement, information about whether an object was detected one of for a first time and detected repeatedly, a clear-cut object designation, and information about a performance reliability of the at least one object-detection arrangement including whether the at least one object-detection arrangement is one of adjusted, soiled, and blinded, and information regarding whether visibility is poor.

4. The apparatus according to claim 1, wherein the first device and the second device are arranged in a shared housing.

5. The apparatus of claim 1, wherein the first device and the second device are arranged in two separate housings.

6. The apparatus of claim 1, wherein the second device including the at least one speed-and-distance controller is configured to generate output signals to control at least one of: a power-regulating control element of an internal combustion engine of the motor vehicle, or an actuator of a deceleration device of the motor vehicle.

7. The apparatus of claim 1, wherein the data exchange device includes a data bus.

8. The apparatus of claim 1, wherein the second device including the at least one speed-and-distance controller is configured to generate output signals to control at least one of a power-regulating control element of an internal combustion engine of the motor vehicle and an actuator of a deceleration device of the motor vehicle, and wherein the data exchange device includes a data bus.

9. The apparatus of claim 8, wherein the first device and the second device are arranged in a shared housing.

10. The apparatus of claim 8, wherein the first device and the second device are arranged in two separate housings.

11. An apparatus for detecting objects, comprising:
a detection device for detection of objects;
a selection device for target-object selection; and
a transmission device for transmitting data;
wherein the detection device detects and measures a kinematic variable of more than two objects, the selection device selects exactly two of the more than two detected objects, the exactly two objects respectively denoting a target object and a potential future target object, and the transmission device transmits the measured kinematic variable of the exactly two selected objects to a speed-and-distance control device at which the kinematic variable of the target object is used to control the speed-and-distance controller and the kinematic variable of the potential future target object is kept standing by as a substitute for the target object.

12. An apparatus for regulating vehicle velocity, comprising:
at least one distance and speed controller;
a first output device for outputting a power-regulating signal for an internal combustion engine;
a second output device for outputting a control signal for a deceleration arrangement;
a data-exchange device;
an object-detection device; and
a target-object selection device;
wherein the object-detection device detects and measures a kinematic variable of more than two objects, and the target-object selection device selects exactly two of the more than two detected objects, the exactly two objects respectively denoting a target object and a potential future target object,
wherein the data-exchange device transmits the measured kinematic variable of the exactly two selected objects to the at least one distance and speed controller,
wherein the power-regulating signal and the control signal for the deceleration arrangement are formed by the at least one distance and speed controller by using the transmitted kinematic variable of the two selected objects, and
wherein the kinematic variable of the target object is used to control the at least one speed and distance controller and the kinematic variable of the potential future target object is kept standing by as a substitute for the target object.

13. The apparatus according to claim 12, wherein the data-exchange device includes a CAN bus.

14. A system for exchanging signals, comprising:
a first device having at least one object-detection unit and at least one device for target-object selection;
wherein the at least one object-detection unit detects and measures a kinematic variable of more than two objects, and the at least one target-object selection device selects exactly two of the more than two detected objects, the exactly two objects respectively denoting a target object and a potential future target object;
a second device having at least one speed and distance control arrangement; and
an apparatus for exchanging signals, wherein the measured kinematic variable of the exactly two selected objects is transmitted from the first device to the second device at which the kinematic variable of the target object is used to control the at least one speed and distance controller and the kinematic variable of the potential future target object is kept standing by as a substitute for the target object.

15. A method for exchange of signals, comprising:
using a first device, that includes at least one object-detection device and at least one device for the target-object selection, for:
detecting and measuring a kinematic variable of more than two objects; and
selecting exactly two of the more than two detected objects, the exactly two objects respectively denoting a target object and a potential future target object; and
transmitting the measured kinematic variable of the exactly two selected objects from the first device to a second device including at least one speed and distance control arrangement at which the kinematic variable of the target object is used to control the at least one speed and distance controller and the kinematic variable of the potential future target object is kept standing by as a substitute for the target object.

16. The method according to claim 15, wherein the data represents at least one of distances of objects to the at least one object-detection device, relative velocities of objects with respect to the at least one object-detection device, absolute velocities of objects, relative accelerations of objects in relation to the at least one object-detection device, absolute accelerations of objects, sway of objects relative to one of a vehicle longitudinal axis and a center axis of the at least one object-detection device, lateral velocities of objects relative to one of the vehicle longitudinal axis and the center axis of the at least one object-detection device, information about whether one of an object was detected for a first time and detected repeatedly, a clear-cut object designation, and information about a performance reliability of a transmitting and receiving device including whether the transmitting and receiving device is one of adjusted, soiled, and blinded, and information regarding whether visibility is poor.

* * * * *